United States Patent

[11] 3,587,366

| [72] | Inventors | Horst Klein;<br>Manfred Schaefer, Wermelskirchen, Germany |
|---|---|---|
| [21] | Appl. No. | 797,950 |
| [22] | Filed | Feb. 10, 1969 |
| [45] | Patented | June 28, 1971 |
| [32] | Priority | Feb. 28, 1968 |
| [33] | | Germany |
| [31] | | K60427/870 |

[54] CRUCIFORM, COLLAPSIBLE TOOLS, SUCH AS TIRE WRENCHES AND THE LIKE
2 Claims, 6 Drawing Figs.

[52] U.S. Cl. ................................................ 81/177B,
81/177D
[51] Int. Cl. ....................................... B25b 13/00,
B25g 1/00
[50] Field of Search ..................................... 81/177.5,
177.5 (F), 177.8, 177.3, 177.1; 287/49, 51

[56] References Cited
UNITED STATES PATENTS
2,619,320 11/1952 Miller ............................ 81/177-3X FOREIGN PATENTS
657,439 11/1963 Italy .............................. 287/51
949,139 2/1949 France ........................... 81/177-3

Primary Examiner—James L. Jones, Jr
Attorney—Abraham A. Saffitz

ABSTRACT: A tool, such as a tire wrench, comprises two arms joined by a threaded bolt for relative pivotal movement from a folded storing position to a cruciform working position. To decrease the bending forces on the bolt when the tool is utilized, a coupling is located between the arms and retained in place by the bolt. The coupling comprises a disc having a first groove in one side, and a second groove at right angles to the first groove in the opposite side. In the cruciform working position, the arms interfit within the grooves, and the threaded bolt is tightened to hold the arms and coupling in their interconnected positions. Manual forces on one arm are resolved by the coupling into a large tensile force component acting axially on the bolt and a negligible bending force component also acting on the bolt. The tensile force on the bolt acts to increase the frictional contact between the surfaces of the second arm and its groove, whereby the major portion of the manual forces on the first arm is transmitted to the second arm by the frictional contact. For better frictional engagement, the interfitting surfaces of the grooves and arms may be roughened.

INVENTORS
HORST KLEIN
MANFRED SCHAEFER
BY *Abraham A. Saffitz*
ATTORNEY

INVENTORS

HORST KLEIN
MANFRED SCHAEFER

BY *Abraham A. Saffitz*

ATTORNEY 3,587,366

CRUCIFORM, COLLAPSIBLE TOOLS, SUCH AS TIRE WRENCHES AND THE LIKE

This invention relates to tools, such as wrenches or the like, which require a high working torque. A representative tool of this type is the conventional cruciform tire wrench wherein one arm is at right angles to the other arm, and wrench sockets or other tool elements are secured to the ends of each arm.

The conventional cruciform wrench is rigid, and is inconvenient to store or house with other tools in view of its shape. To remedy the storage problem, the cruciform tire wrench has been made in the form of two separable arms pivoted to each other in the center by means of a fastening means such as a screw or pin means. Thus, both arms can be arranged parallel to each other for storage, and placed in a cruciform position for use. In the cruciform position, the screw means is tightened to maintain the arms rigidly in that position under the work torque forces. The fastening screw or pin means transmits the major portion of the torque force exerted manually on one arm to the other arm which engages the nut to be worked on, and is therefore subject to great bending and tension stresses. Since the size of the arm-fastening means is limited by the cross-sectional size of the arms, and the arms are further weakened by the holes passing therethrough for the fastening means, the working torque must be limited or the wrench will bend or break.

In order to rigidly hold and strengthen the arms in the cruciform position under the high working forces when the tire nuts are loosened or tightened, it has been proposed (U.S. Design Pat. No. 178,035) to shape the portions of the two arms which are in contact to provide interengaging surfaces of increased area. However, such interengaging surfaces are relatively small and do not transmit any more torque from the lever arm to the nut-engaging arm than conventional wrenches. The arm-fastening means still transmits the major portion of the working torque and is therefore subject to undue bending and tension stresses.

An object of this invention is to provide a cruciform tool of the above-described type with a coupling means between the two arms for transmitting a large portion of the manual torque force exerted on the lever arm directly to the other arm and thus reduce the bending stress on the fastening means joining the arms.

Another object is to provide a novel coupling, located between the arms of a foldable, cruciform tire wrench for transmitting torque from one arm to the other arm. The coupling is in the form of a body, such as a disc, having a groove on one side interfitting with the center section of one of the arms. The other side of the disc is provided with a similar groove, but at right angles to the first groove, and interfitting with the center section of the other arm. A hole is provided in the center of the disc to coincide with the holes in the arms to receive the fastening means, usually in the form of a bolt and wing nut. The arms are located in the grooves of the disc, and upon tightening the fastening means the assembly is maintained rigidly in its cruciform position. The cross-sectional shape of the grooves corresponds to the cross-sectional shape of the sections of the arms with which the grooves interengage. Since the tool is usually made of round stock, the cross section of a groove forms substantially a semicircle. The coupling resolves the manual torque force on one arm into a large tensile or pull stress on the fastening means, a stress which the means can withstand, and a small bending stress.

Further objects and advantages will be apparent from the following description and accompanying drawing.

Referring to the drawings.

Figure 1:
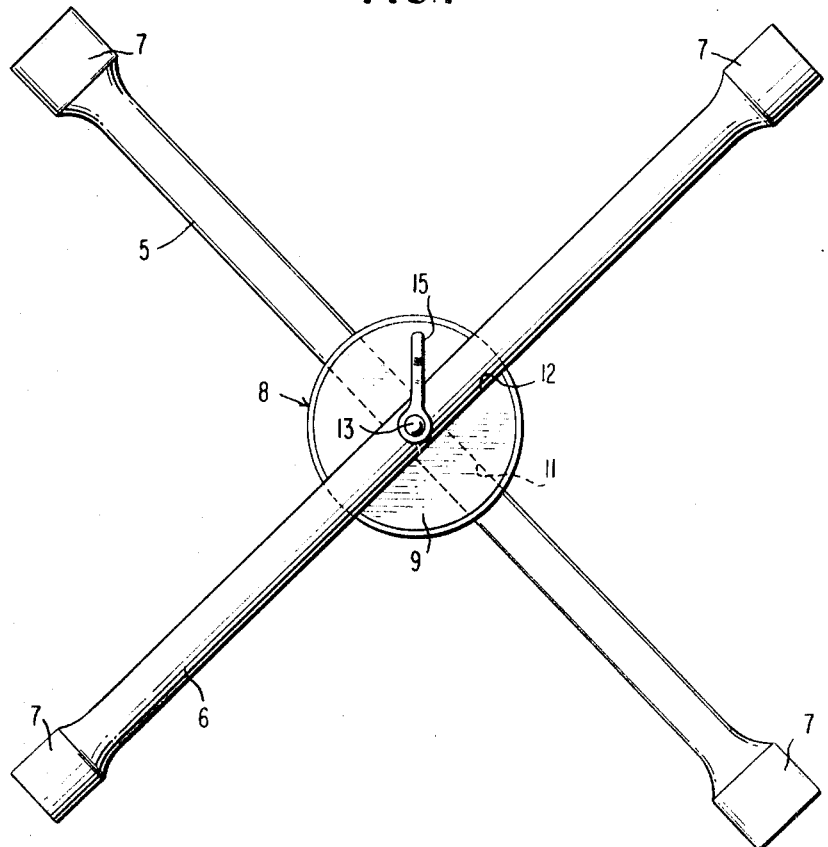
FIG. 1 is a bottom view of a foldable tire wrench with the arms in the unfolded, cruciform working position.

Referring to FIG. 1, the device comprises arms 5 and 6 and a tool element secured to the end of the arms. While the device is shown with tool elements 7 comprising conventional wrench socket means for cooperation with tire rim nuts, thus forming a tire wrench, tool elements 7 may comprise other tools, such as screwdriver bits. Substantially at the center portion of each arm, holes are formed to receive a fastening means to connect the arms to each other and to a coupling 8 located between the arms.

Figure 4:
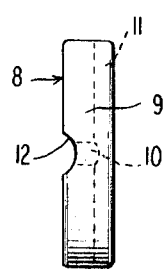
FIG. 4 is a side view of the coupling disc.

The coupling 8 is formed by a body 9, preferably in the form of a disc. Disc 9 is provided with a center hole 10 passing therethrough, a groove 11 formed in one face, and a groove 12 formed in the opposite face at right angles to groove 11. The cross section of grooves 11 and 12 generally conform to the cross-sectional shape of arms 5 and 6, but to a depth limited to substantially half, or less than a half, of the corresponding dimension of the arms. Thus, as shown in FIG. 4, the cross-sectional shape of groove 12 is a portion of semicircle to interfit with the surface of the round stock from which arms 5 and 6 are usually fabricated. Grooves 11 and 12 may fully contact the cooperating surfaces of the arms, or may contact them only at the edges of the groove for a more binding effect. To increase the frictional contact between the interengaging surfaces of the grooves and arms, the contacting surfaces of the grooves, or arms, or both may be roughened, as by sand blasting. For a more positive engagement, some or all of the above contacting surfaces may be deformed as by knurling or serrating.

Disc 9 is of sufficient thickness to provide a web of sufficient thickness at the point where the grooves cross each other for the passage of a hole 13.

Figure 2:
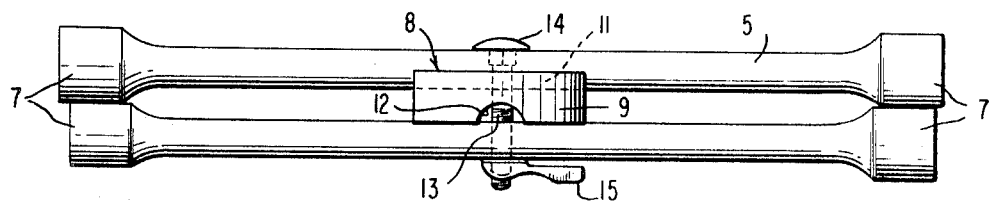
FIG. 2 is a side view of the tire wrench of FIG. 1 in the folded position.
Figure 3:
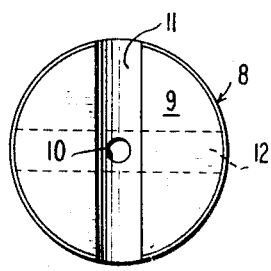
FIG. 3 is a top view of the coupling disc.

FIG. 2 shows the tool in folded position for storage. Arm 5 fits into groove 11. Arm 6 is parallel to arm 5 and spans groove 12. The fastening means is formed by a bolt means 13 having a head 14 and cooperating with a nut means, such as wing nut means 15. Bolt 13 passes through the aligned holes in arms 5 and 6 and hole 10 of coupling 8. By tightening nut 15, the parts of the tool are held in folded position.

To use the tool, as a tire wrench for working on a tire arm nut, wing nut 15 is loosened and arm 6 is moved 90° to interfit with groove 12. Nut 15 is tightened to exert sufficient pressure to hold the arms in their cruciformed position (FIG. 1) to form a structure sufficiently rigid to withstand the torque forces. For explanatory purposes only, arm 6 is termed the nut-engaging arm, because one of its sockets 7 engages the tire nut (not shown) to be loosened or tightened, and arm 5 is termed the lever arm, because the manual effort is applied thereto to rotate the arm 6. Thus, by applying a manual torque force to arm 5, arm 6 is rotated in the desired direction to loosen or tighten the tire nut in the usual manner.

Figure 6:
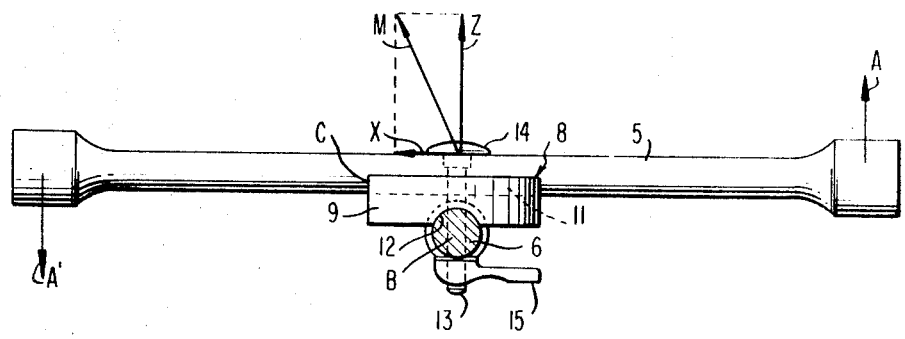
FIG. 6 is a part cross-sectional view of the wrench with a force diagram added thereto to show the several component forces acting on the connecting fastening means.

The purpose of coupling 8 to join arms 5 and 6, and its advantage over the arm joining means of the prior art are brought out in the force diagram of FIG. 6. The manual force is applied to the ends of arm 5 in the direction of arrows A and A'. The major portion of the torque on arm 5 is transmitted to arm 6 by coupling 8 with only minor bending stresses on bolt 13. Analysis of the force transmission shows that the forces on arm 5 are transmitted to edge C of disc 9 as a compressive force, and to the head 14 of bolt 13 as a tensile or pulling force. In view of the relatively large distance between edge C and the axis of bolt 13, bolt 13 will be subjected to a major tensile force and a minor bending force. This relationship of forces is shown in FIG. 6, wherein the resultant force M on bolt 13 can be resolved in a major tensile component Z, and a minor bending component X. As the distance of edge C from the axis of bolt 13 increases, the component X becomes smaller.

The above analysis is true when bolt 13 is inserted loosely in the opening of arm 5. If bolt 13 is force fitted in the opening of arm 5, the bending stress on bolt 13 would diminish to almost zero, since with the press fit bolt 13 and arm 5 form a substantially rigid body.

As a result of the large tensile component Z exerted on bolt 13, the arm 6 is pressed tightly within its groove 12 against the surface of disc 9. This creates a strong frictional contact between disc 9 and arm 6 so that the transfer of torque from arm 5 to arm 6 takes place almost exclusively throughout the frictional contact, thereby greatly reducing the bending stresses on bolt 13. In order to enhance the frictional contact between the disc and the arms, the contacting surfaces may be roughened as by sand blasting, knurling and other methods.

If arm 6 is used as the manual lever arm, the above-described forces will act on wing nut 15 and resolve in a major tensile force component and a very minor bending component acting on bolt 13, for the same reasons stated above.

Figure 5:
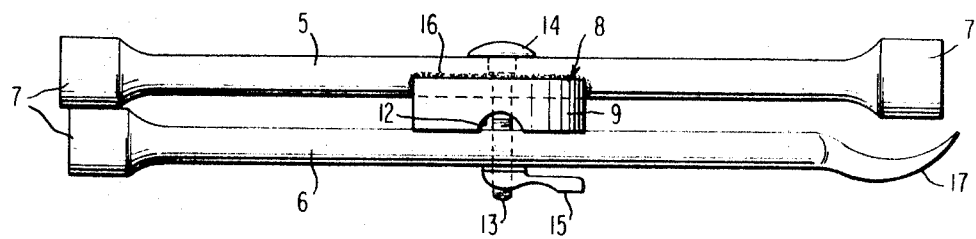
FIG. 5 is a side view of a modified tire wrench in the folded position.

FIG. 5 discloses a modification of the tool of FIGS. 1—4. In the modification, coupling 8 has been welded to arm 5 at 16. The disc 9 and arm 5 thereby form a rigid structure whereby the manual torque forces applied to arm 5 do not provide any significant bending stresses on bolt 13.

Arm 6 of the tool of FIG. 5 is provided at one end with a tool element 17 for prying off a hub cap, in lieu of a wrench socket as in FIGS. 1—4. As stated above, the wrench sockets 7 may be replaced by other tool elements which require torque forces for operation, such as screwdriver elements.

Thus, a simple, inexpensive, foldable tool, such as a tire wrench, has been provided, composed of easily produced and assembled elements. When the wrench is in its cruciform working position, it provides an efficient torque transmitting means from the lever arm to the nut-engaging arm without exerting undue or almost no bending stresses on the fastening bolt means joining the arms.

Although certain embodiments of the invention have been disclosed for purpose of illustration, it will be evident that various changes and modifications may be made therein without departing from the scope and spirit of the invention.

We claim:

1. A collapsible tool comprising:
    a. two arms having holes intermediate their ends, one of said arms carrying a wrench socket element at its ends and the other carrying a hub cap removal tool or a wrench socket element;
    b. bolt-fastening means passing through said holes to join said arms for relative pivotal movement from an aligned position to a cruciform position;
    c. nut means to secure said bolt;
    d. coupling means welded at one of its faces to one of said arms to interconnect said arms and to transmit torque forces from one arm to the other arm;
    e. said coupling means having a hole for the passage of said fastening means therethrough, said fastening means holding said coupling means and arms in their interconnected positions when the arms are pivoted to the cruciform position;
    f. said coupling means receiving said torque forces acting on one arm and resolving said forces into a large component acting axially on said fastening means and a negligible component tending to produce bending stresses on said fastening means; and
    g. said axial component acting on the fastening means to increase the frictional contact between the coupling and the other arm so that the major portion of the manual forces acting on said arm is transmitted to said other arm through said frictional contact.

2. A collapsible tool as claimed in claim 1, wherein said coupling means has a groove formed in the face opposite the welded face, said groove receiving the central portion of the arm coupled to said coupling means.